UNITED STATES PATENT OFFICE.

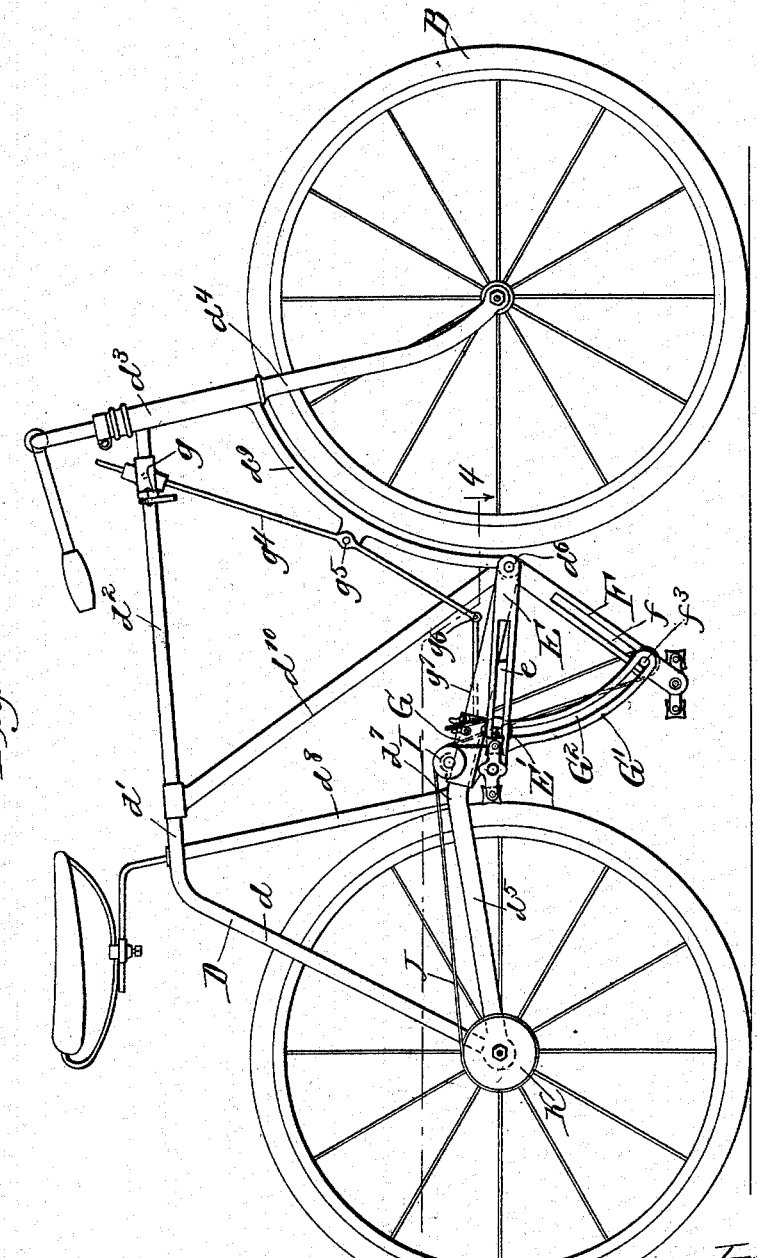

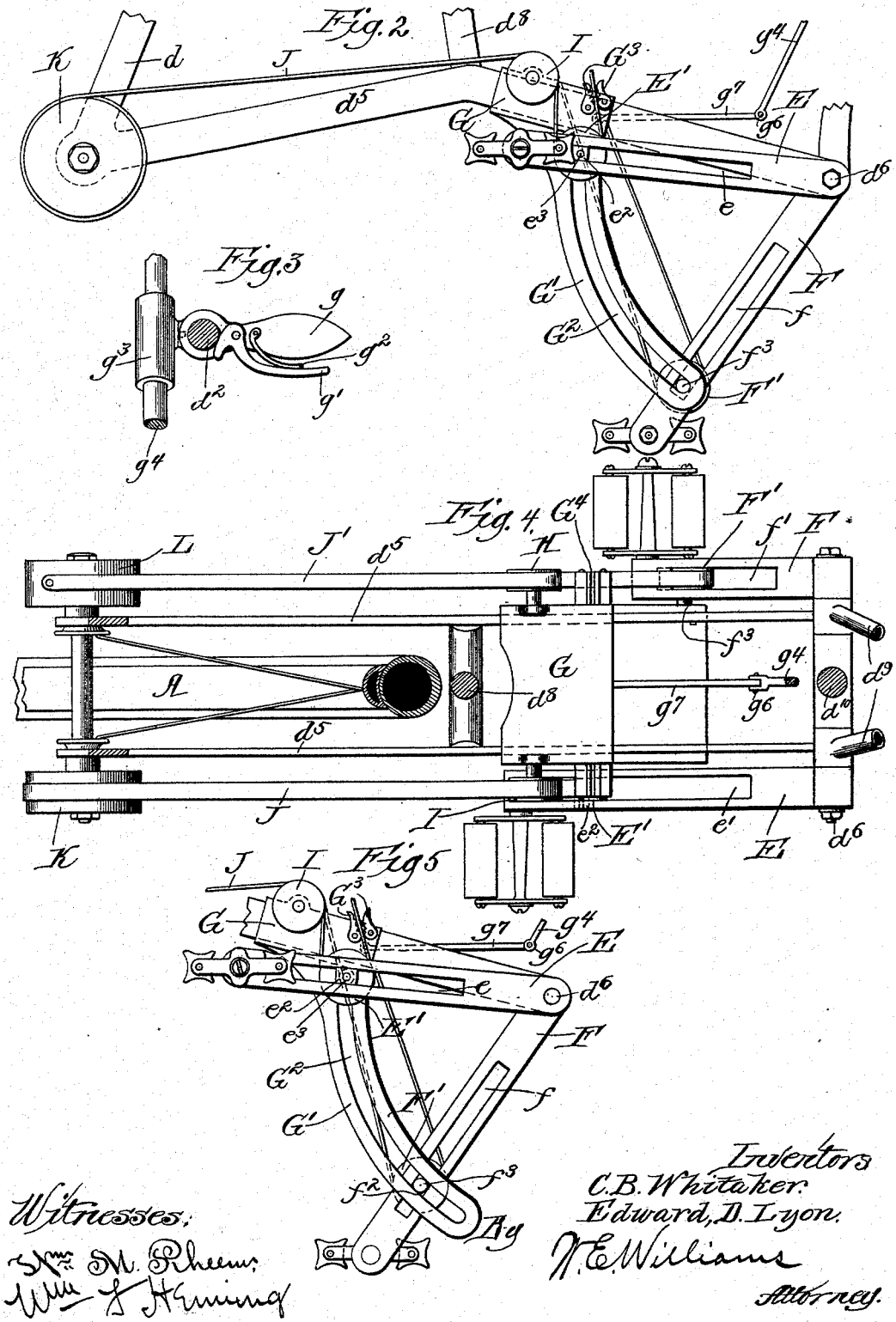

CHARLES B. WHITAKER, OF CHARLOTTE, AND EDWARD D. LYON, OF CARSON CITY, MICHIGAN.

BICYCLE.

SPECIFICATION forming part of Letters Patent No. 527,396, dated October 9, 1894.

Application filed August 26, 1893. Serial No. 484,114. (No model.)

*To all whom it may concern:*

Be it known that we, CHARLES B. WHITAKER, of Charlotte, Eaton county, and EDWARD D. LYON, of Carson City, Montcalm county, Michigan, citizens of the United States, have invented a new and useful Improvement in Bicycles, of which the following is a specification.

Our invention relates to the driving gearing of a bicycle whereby the rider may shift at will, without stopping, the ratio of movement of the pedals to that of the driving wheel and whereby the space through which a foot moves with the pedals while not doing useful work is reduced to the minimum and whereby the movement of the pedals is produced in a direction more to the comfort of the rider than with other gearing and whereby the period of dead center of the action of the pedals is reduced to a minimum.

The invention consists in the devices set forth in the claims hereof.

Reference will be had to the accompanying drawings, in which—

Figure "1" is a side view of the bicycle. Fig. "2" is a detail side view showing the driving gear on an enlarged scale. Fig. "3" is a sectional detail view of the handle of the gear shifting mechanism. Fig. "4" is a plan sectional view on line 4—4 Fig. "1." Fig. "5" is a side sectional view of the driving mechanism when the same is shifted to a new position from that of the other figures.

The wheels A, and B, are connected by the frame D, in a manner to conform to the general outline of an ordinary safety bicycle. The frame D, is composed of double struts $d$, extending from the axis of wheel "A" up to and united in a single bar at or near the seat junction "$d'$" which single bar is shown as "$d^2$" connected to the sleeve "$d^3$" of the fork "$d^4$" and the lower portion of the frame is composed of double bars "$d^5$" extending from the axis of wheel "A" to the axis of the pedal arms at "$d^6$" and are connected together there, and at "$d^7$" from which point a rod "$d^8$" extends up to the cross bar "$d^2$." From "$d^6$" two bars "$d^9$" extend up to the sleeve "$d^3$" and from the point "$d^6$" one bar "$d^{10}$" extends up to bar "$d^2$." On each side of the frame, pivoted at "$d^6$" are pedal levers "E" and "F." These levers "E" and "F" have slots "$e$" "$f$" and slots "$e'$" and "$f'$." Into slots "$e$" and "$f$" are boxes "$e^2$" "$f^2$" which carry rollers "E'" and "F'." A frame "G" is carried on the bars "$d^5$" by slots in the frame, which frame slides easily on the bars "$d^5$" between the points "$d^7$" "$d^6$" and is held in fixed position by the following mechanism: On the rod "$d^2$" there is a handle "$g$" which slides readily on the rod "$d^2$" and is held in any desired position by a friction grip "$g'$" Fig. "3" which is held in engagement by a spring "$g^2$." Pivoted to the handle block "$g$" is a block "$g^3$" through which slides the end of a lever "$g^4$" which is pivoted at "$g^5$" to the frame posts "$d^9$." To the lever "$g^4$" at "$g^6$" is connected a link "$g^7$" connected to frame "G."

By the mechanism just described the rider can adjust the position of frame "G" as desired.

On frame "G" are two rollers "H" and "I." Extending from lower side of frame "G" is an arm "G'" which has a slot "$G^2$." The inner ends of the shafts "$e^3$" "$f^3$" of rollers "E'" "F'" extend into slot "$G^2$" of arm "G'" and are held thereby in position in slots "$e$" "$f$" of pedal arms "E" "F." On frame "G" are fixed clamps "$G^3$" "$G^4$" in which are fastened straps "J" and "$J'$" of leather, steel or brass or other suitable flexible bands which are trained from clamps "$G^3$" "$G^4$" down under rollers "E'" "F'" and up over rollers "H" and "I" and back to and around pulleys "K" and "L" and their ends are fixed on the rims of said pulleys "K" and "L" after enwrapping the same sufficiently. Said pulleys "K" and "L" are carried on the axis of wheel "A" and are provided with suitable ratchets or clutch mechanism for driving wheel "A" in one direction only. These ratchets are within pulleys "K" "L" therefore do not show in the drawings.

The operation of the device is thus: The movement of the pedal arm "E" from position shown to corresponding position of arm "F" the roller "E'" draws down band "J" and produces a draft of the band "J" over pulley "K" equal to twice the distance of the travel of the roller "E'." Should the rider desire more purchase in driving he loosens and pulls the handle "$g$" toward him thereby moving the frame "G" nearer to the point "$d^6$" which by the slot "$G^2$" carries the rollers "E'" "F'" in their respective slots "$e$" "$f$" nearer the pivots "$d^6$" thereby shortening the distance of travel of rollers "E'" "F'" while the pedal movement remains the same and the rider may do this at any time desired whether in motion or not.

Fig. "5" shows position when the frame "G" is nearer the point "$d^6$" than at the other views. Hence in this view the pedals have more leverage on the movement of wheel.

By reason of the ratchet connection of pulleys "K" and "L" with the wheel "A" the rider is not obliged to keep his feet in motion at all times when they are on the pedals as is the case with other systems with other gearing and the periods of dead center are at the point only of reversing of motion of the pedals and not through quite an arc of the circle as is the case of rotary pedals and the movement of the pedals in our gearing is in nearly a direct line from the seat which movement performs useful work on the entire downward stroke at the full leverage while with rotary pedals a large part of the movement is lateral movement and quite a portion of the downward movement is at so short a leverage as to perform little useful work and hence the foot moves through quite a space that tires the rider but serves little purpose in driving the wheel. The movement of the pedals of our gearing is in a line more natural to the action of the muscles of the limbs than with rotary pedals which is a desideratum.

What we claim is—

1. A bicycle having driving mechanism as described; having foot pedal arms "E" and "F;" bands "J" "J';" carriage "G;" mechanism adjustably connected to arms "E" and "F" for deflecting bands "J" "J';" a projection "G'" of said carriage, "G" engaging said band deflecting mechanisms of the pedal arms and thereby holding said mechanisms in position on said arms substantially as shown.

2. In a bicycle the combination, of pulleys connected to drive the driving wheel by ratchet mechanism, of flexible bands for intermittently driving said pulleys as shown, of an adjustable carriage carried on ways on the frame of the bicycle, of mechanism for adjusting said carriage at all times when the bicycle is in motion, of rollers pivoted on said carriage, said flexible bands trained over said rollers on said carriage and their ends fixed to said carriage, of oscillating foot pedal arms pivoted to the frame of the bicycle, of mechanism attached to said foot pedals for deflecting said bands between said rollers and their points of fixture of said bands on said carriage.

3. In a bicycle the combination, of oscillating pedal arms pivoted to the frame of the bicycle, of flexible bands enwrapping pulleys on the driving wheel and intermittently driving the same, of mechanism connected to the pedal arms for deflecting said bands in driving the same, which mechanism is adjustable in the radial distance of said pedal arms, of a carriage connected to the frame of the bicycle and connected by suitable mechanism to said band deflecting mechanism on the pedal arms and constructed to be adjustable in a manner that its adjustment fixes the adjustment of said band deflecting mechanism on said pedal arms, of mechanism for fixing the ends of said bands on said carriage, of rollers on said carriage over which said bands are deflected as shown.

4. In a bicycle the combination, of ways $d^5$ on the lower frame pieces of the bicycle, said ways being in the general line between the centers of the forward and rear wheels, of a carriage supported on said ways, of mechanism for adjusting said carriage at all times on said ways when the bicycle is in motion, of oscillating pedal arms pivoted to said frame in the region of the general line of said ways, of flexible bands enwrapping pulleys on the driving wheel of the bicycle and intermittently driving the same, said bands trained over rollers on said carriage and their ends fixed to said carriage, of mechanism adjustably attached to the foot pedals for deflecting said bands in the manner and for the purpose shown and described.

In witness whereof we have hereunto subscribed our names in presence of two witnesses.

C. B. WHITAKER.
     EDWARD D. LYON.

Witnesses for Whitaker:
 L. W. MURPHY,
 ALBERT FISHER.
Witnesses for Lyon:
 O. R. GOODNO,
 L. A. LYON.